United States Patent
Yang et al.

(10) Patent No.: US 10,263,892 B2
(45) Date of Patent: Apr. 16, 2019

(54) COMPRESSION METHOD AND SYSTEM FOR USER FRIENDLY ADDRESS IN MESH NETWORKING

(71) Applicant: Microchip Technology Incorporated, Chandler, AZ (US)

(72) Inventors: Yifeng Yang, Chandler, AZ (US); Dale Loia, San Jose, CA (US); Dave Richkas, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 71 days.

(21) Appl. No.: 15/073,238

(22) Filed: Mar. 17, 2016

(65) Prior Publication Data

US 2016/0277298 A1 Sep. 22, 2016

Related U.S. Application Data

(60) Provisional application No. 62/136,016, filed on Mar. 20, 2015.

(51) Int. Cl.
*H04W 4/80* (2018.01)
*H04L 12/44* (2006.01)
*H04L 29/12* (2006.01)
*H04L 12/743* (2013.01)

(52) U.S. Cl.
CPC .......... *H04L 45/7453* (2013.01); *H04L 12/44* (2013.01); *H04L 61/2596* (2013.01); *H04L 61/301* (2013.01); *H04L 61/3065* (2013.01); *H04W 4/80* (2018.02)

(58) Field of Classification Search
CPC . H04L 45/7453; H04L 12/44; H04L 61/2596; H04L 61/301; H04L 61/3065; H04W 4/008; H04W 4/80
See application file for complete search history.

(56) References Cited

U.S. PATENT DOCUMENTS

| 6,658,420 | B1 * | 12/2003 | Brinnand | H04L 41/00 |
| 9,407,716 | B1 * | 8/2016 | Desai | H04L 61/10 |
| 2010/0046443 | A1 * | 2/2010 | Jia | H04W 76/021 370/329 |
| 2010/0061350 | A1 | 3/2010 | Flammer, III | 370/338 |
| 2012/0220320 | A1 * | 8/2012 | Casto | H04L 61/106 455/466 |

(Continued)

OTHER PUBLICATIONS

International Search Report and Written Opinion, Application No. PCT/US2016/023026, 10 pages, dated Jun. 9, 2016.

*Primary Examiner* — Oussama Roudani
(74) *Attorney, Agent, or Firm* — Slayden Grubert Beard PLLC

(57) ABSTRACT

A method for operating a mesh network is described. The method includes using a protocol comprising an address and a payload, wherein the address and payload are restricted. The method also includes using a hash function to generate an address from a description, wherein the description uses ASCII characters, wherein a message uses the description as an address and wherein the description is transformed into the address using the hash function and added together with the message into the payload, assigning the generated address to a device, wherein the device is part of a mesh network, and in a transmission from a source to the device, providing the generated address within the payload.

16 Claims, 2 Drawing Sheets

(56) References Cited

U.S. PATENT DOCUMENTS

| | | | | |
|---|---|---|---|---|
| 2014/0370811 | A1* | 12/2014 | Kang | H04W 84/18 |
| | | | | 455/41.2 |
| 2015/0120000 | A1* | 4/2015 | Coffey | H04L 12/2803 |
| | | | | 700/13 |
| 2015/0351204 | A1* | 12/2015 | Hershberg | G08C 23/02 |
| | | | | 315/153 |

* cited by examiner

COMPRESSION METHOD AND SYSTEM FOR USER FRIENDLY ADDRESS IN MESH NETWORKING

CROSS-REFERENCE TO RELATED APPLICATIONS

This application claims priority to commonly owned U.S. Provisional Patent Application No. 62/136,016 filed Mar. 20, 2015; which is hereby incorporated by reference herein for all purposes.

TECHNICAL FIELD

The present disclosure relates to mesh networking, in particular to compression method and system for user friendly address in mesh networking.

BACKGROUND

In mesh networks using, for example, Bluetooth technology, there exists a need for resource saving. To a resource-restricted networking protocol that supports mesh routing, the requirement to specify source and destination is a burden. As an example, Bluetooth Low Energy has a payload of 25 bytes wherein the Bluetooth address is six bytes. When security (e.g., Advanced Encryption Standard—counter with cipher block chaining message authentication code mode) is enabled, there is no room for payload.

SUMMARY

There exists, therefore, a need for enabling such mesh networking under restricted conditions without modifying existing Bluetooth specifications. A further need exists for a user friendly system. According to various embodiments, a method is proposed to not only compress certain portions of the mesh network packet (e.g., the MAC address, MIC field, other authentication fields, etc.), but also enable a user to give an address label for the message using user-friendly terms such as "Table Lamp in Study Room" instead of multiple bytes of meaningless numbers.

According to various embodiments, systems and methods for operating a mesh network using a protocol comprising an address and a payload, wherein the address and payload are restricted are disclosed. The method includes: using a hash function to generate a device address from a user-friendly address; assigning the generated device address to a device, wherein the device is part of a mesh network; and in a transmission from a source to the device, providing the generated device address within a payload of the transmission.

In some embodiments, the protocol is designed for a star network. In such embodiments, the protocol is a Bluetooth low energy protocol.

In some embodiments, the user-friendly address may include ASCII characters, a graphical image, and/or a multimedia file. In such embodiments, a message may use the description as an address and wherein the description is transformed into the address using the hash function and added together with the message into the payload.

In some embodiments, the generated device address within the payload comprises mapping the generated device address to a network address. In the same or alternative embodiments, providing the generated device address within the payload may include mapping the generated device address to a network address and a message integrity code.

In such embodiments, wherein mapping the generated device address to the message integrity code may include applying an exclusive-or function to a portion of the generated device address and the message integrity code.

In some embodiments, the method may include using a hash function to generate a device address from a user-friendly address; assigning the generated device address to a device, wherein the device is part of a mesh network; and in decoding a transmission from a source to the device, parsing the generated device address within a payload of the transmission.

DETAILED DESCRIPTION

Figure 1:
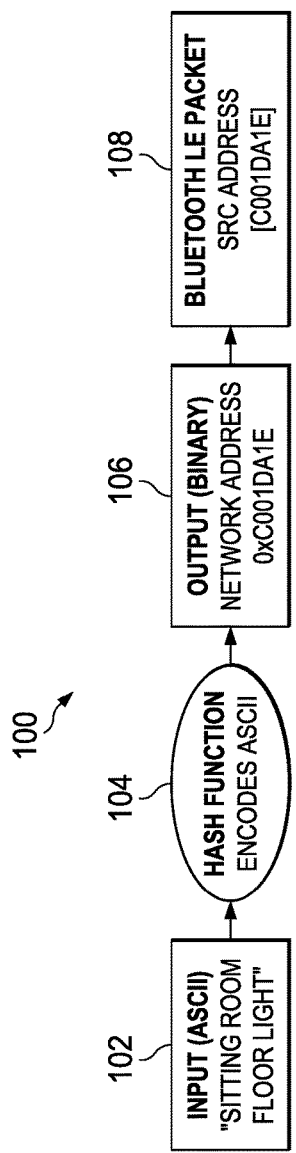
FIG. 1 illustrates an example encoding of a "friendly name" into the network address, in accordance with certain embodiments of the present disclosure.

There exists a need for enabling such mesh networking under restricted conditions without modifying existing Bluetooth specifications. A further need exists for a user friendly system. According to various embodiments, a method is proposed to not only compress certain portions of the mesh network packet (e.g., the MAC address, MIC field, other authentication fields, etc.), but also enable a user to give an address label for the message using user-friendly terms such as "Table Lamp in Study Room" instead of multiple bytes of meaningless numbers.

For the purposes of this disclosure, a "user friendly address" may include any language, image, video, and/or other multimedia data associated with a device that a user wishes to control. For the purposes of this disclosure, the example used is a medium-sized office with multiple floors, multiple rooms, and multiple devices within each room. Of course, other configurations, buildings, layouts, devices, etc. may be readily applicable without departing from the scope of the present disclosure. As an initial example, an office may include mesh network-controllable light bulbs. In an effort to more efficiently control those devices (e.g., network-controllable light bulbs).

As an example, a user controlling the device control system may wish to label each individual device with a label that is more meaningful to the user than the string of numbers associated with a MAC address. For example, the user may wish to label a device with ASCII characters that are descriptive of the device, its location, its functionality, etc. For example, the user may wish to label a particular light bulb as "Third light bulb in the fourth office on the right side of the hall on the second floor." As an additional example, the user may wish to label a device with an image (e.g., a photograph of the device or an image representative of the device, etc.), a video, an animated image, other text- and/or multimedia-based labels, and/or other user-friendly appellation associated with a mesh-network-controlled device.

For the purposes of this disclosure, a "mesh network" is any appropriate computer network topology in which each node relays data for the network. For example, Bluetooth and Bluetooth Low Energy ("BLE") are mesh network topologies that are used to control remote devices and may be particularly apt to the present disclosure.

Furthermore, with proper device description, this method could support a basic inheritance tree. This is not limited to any particular mesh network. It could be expanded to support BLE or other mesh networking protocols. For example, Microchip's MiWi protocol could use this mechanism to be more user friendly. However, other protocols may be used.

According to various embodiments, a suitable hash function is chosen to generate encode the user-friendly address for communication within the mesh network. In some embodiments, encoding the user-friendly address may include using a suitable hash function to encode the address into a data field of a predetermined size. The encoded field may then be mapped to an existing portion of the mesh network specification field. For example, the encoded field may be mapped to the networking address field.

In some embodiments, a networking address may be based on a destination MAC address, device name, or any user-defined descriptions. As described above, these networking addresses may be strings of numbers that are generally meaningless to a user. In conventional systems, the general approach to solve this problem is to increase the resources, but not to lower the resources requirements. Network addressing is generally randomly generated or based on MAC address. However, according to various embodiments of the present disclosure, a hash function may be used to generate a compressed address.

In some configurations of the present disclosures, a target network topology may include networks with a star topology. For example, the Bluetooth protocol may be designed for a star topology. The Bluetooth Low Energy (BTLE) protocol is designed for simplicity and allows for a thirty-nine byte broadcast and a twenty-three byte unicast. Thus, there is hardly any room for mesh routing which requires a destination address, a source address, and security requirements.

For network address, a simplest approach would provide for six-byte MAC address and embed MAC the address of the destination in the payload. MAC addressing issues are that a group of devices may be provided. Furthermore, this approach may take too much space in the payload. For example, in an extreme case, eight bytes of unencrypted payload would be used which leaves zero bytes payload if CCM encryption is used.

A ZigBee/MiWi protocol uses a short address (two bytes). However, there are issues of short address, in particular regarding a short address assignment. In the mapping of the short address field with a user-friendly address label (e.g., "How do you know Red Light in Study Room"), it is difficult to know if that address label has a short address of, for example, 0x1234?

Other solutions increase the available resources. For example, a fragmentation in L2CAP could be used which is more complex and will not be supported by all vendors. A proprietary hardware solution with larger payload would have no compatibility and would thus be restricted to a single supplier.

According to various embodiments of the present disclosure, instead the present system and method lower the resource requirements. The use of a hash address is used instead. This provides for a hash function that maps large data to short data. A BLE device could define multiple addresses, for example, with a user-friendly address (e.g., ASCII description, image, video, etc.). A hash function could generate hash code for each user-friendly address. The BLE may then map the hash code (e.g., the encoded user-friendly address) to the network address field. The hashed address could then be used to replace MAC address or a group address.

In certain embodiments of the present disclosure, mapping the hashed address to the network address field may be insufficient. For example, if the user-friendly address is sufficiently long (e.g., the information contained within the user-friendly address is larger than can be encoded in a data field the size of the network address field), then it may be possible to generate identical hashed values for different user-friendly addresses.

In order to address this limitation, in some embodiments, the hashed value may be further subjected to additional processing in order to be mapped to additional fields. For example, the hashed value may be subjected to security processing in order to be mapped to security information fields.

For example, certain security engines may encode input data so that it is different from the output and a key is needed to perform the decryption. One downfall to this approach is that the same data in may result in the same data out. For example, with network-controllable devices (e.g., light bulbs), a command to turn on may be coded as 01. Under certain security schemes, encoding this same command may result in the same output (e.g., 05). This may leave the security scheme open to certain exploitations such as replay attacks. One approach to prevention in such a situation is message authentication. For example, a system may include a frame counter associated with a message sender. A frame counter may be designed to only increment and to increment whenever a message is sent. In such a configuration, at the receiving side, a message recipient may authenticate a message by checking that the frame counter is different from that of the last received message if the hash is identical. If the frame number is the same, then a decoding error message (e.g., reject this message) may be generated. In the same or alternative configurations, an authentication engine may add a Message Integrity Code ("MIC") to the end of a message. For a MIC, when the frame counter changes, a different MIC is generated.

For some embodiments, the encoded user-friendly address may be mapped to the network address as well as these additional security fields. For example, a system may encounter duplicate hash copes for different inputs if the size of the network address field is insufficiently large. By mapping the encoded user-friendly address to the network address and MIC fields, a system may take advantage of a longer hash code to avoid duplication.

For example, a typical MIC may be four bytes. A system or method may perform an exclusive-or ("XOR") operation with the hash code and the MIC to get different MICs. On the receiving end, a MIC may be generated using same process. The receiving-side system may then exclusively-or that MIC with the receiver-side generated hashed value. If the generated MIC values match, then the receiver-side system knows that the message was intended for that system and authentication.

On sending side, the sending-side system generates a description, generate hash, get code. On receiving side, the system does the same thing. There may only be so much description space available (e.g., 64 k). If this is insufficient, it may be expanded to 64-bit. Rather than having the encoded user-friendly address mapped only to the network address, a system may put the first two encoded bytes in network address, and XOR last two bytes with the MIC. On receiving side, the receiving-side system tries to do the decryption. It may use the old hash to XOR with MIC. If there are duplicate hashes, the receiving-side system may ignore the message if the decrypted MICs don't match. In such a manner, the existing network topology specifications and network security protocols to extend the address space for an encoded user-friendly address. The network security protocols may be used to verify the extended encoded address space.

FIG. 1 illustrates an example encoding 100 of a "user-friendly address" into the network address, in accordance with certain embodiments of the present disclosure. This method is BLE specification compliant and backward compatible. The method saves space. A worst case may use sixteen bytes of unencrypted payload, and eight bytes of encrypted payload. No mapping is necessary. Instead of, for example, addressing 0x1234, one could address the message to "Sitting Room Floor Light."

In some embodiments, encoding 100 may include input 102. Input 102 may be a user-friendly input (e.g., written in ASCII text, image, etc.) such as "Sitting Room Floor Light." This input is passed to hash function 104. Hash function 104 operates to encode input 102. Once encoded, the input may then be communicated to binary output 106. Binary output 106 may be a binary network address for the encoded input. For example, the output may be 0Xc001DA1E. Once this output is generated, it may be communicated to mesh network packet 108. For example, mesh network packet 108 may be a Bluetooth LE packet with a source address (e.g., C001DA1E).

Figure 2:
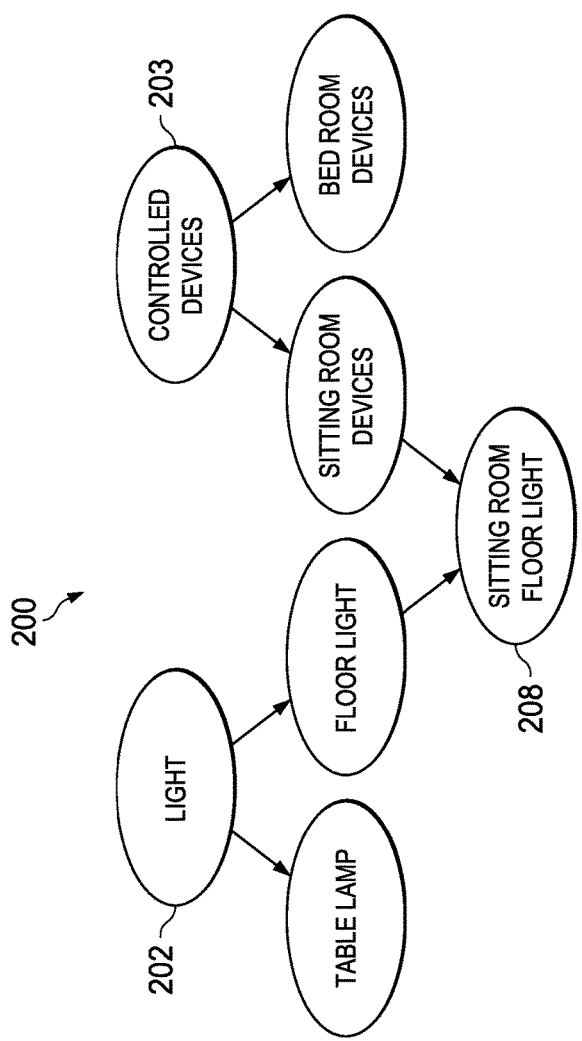
FIG. 2 illustrates an example inheritance relationship based on a has input in an exemplary network, in accordance with certain embodiments of the present disclosure.

FIG. 2 illustrates an example inheritance relationship 200 based on a has input in an exemplary network, in accordance with certain embodiments of the present disclosure. FIG. 2 illustrates a potential method for inheriting network address relationships among devices that have user-friendly inputs associated with them. For example, relationship 200 may include first-tier labels 201, 202. In this example, first-tier labels include light 201 and controlled devices 202. Under these labels are second-tier labels 203, 204, 205, 206. These second-tier labels may inherit certain dependency information from first-tier labels 201, 202. In the example, second-tier labels include table lamp 203, floor light 204, sitting room devices 205, and bedroom devices 205. Relationship 200 may also include third-tier label 206. In this example, this tier includes sitting room floor light 206, which inherits dependency information from second-tier labels floor light 204 and sitting room devices 205. In such a manger, relationship 200 may map each home device to a dependency map.

Figure 3:
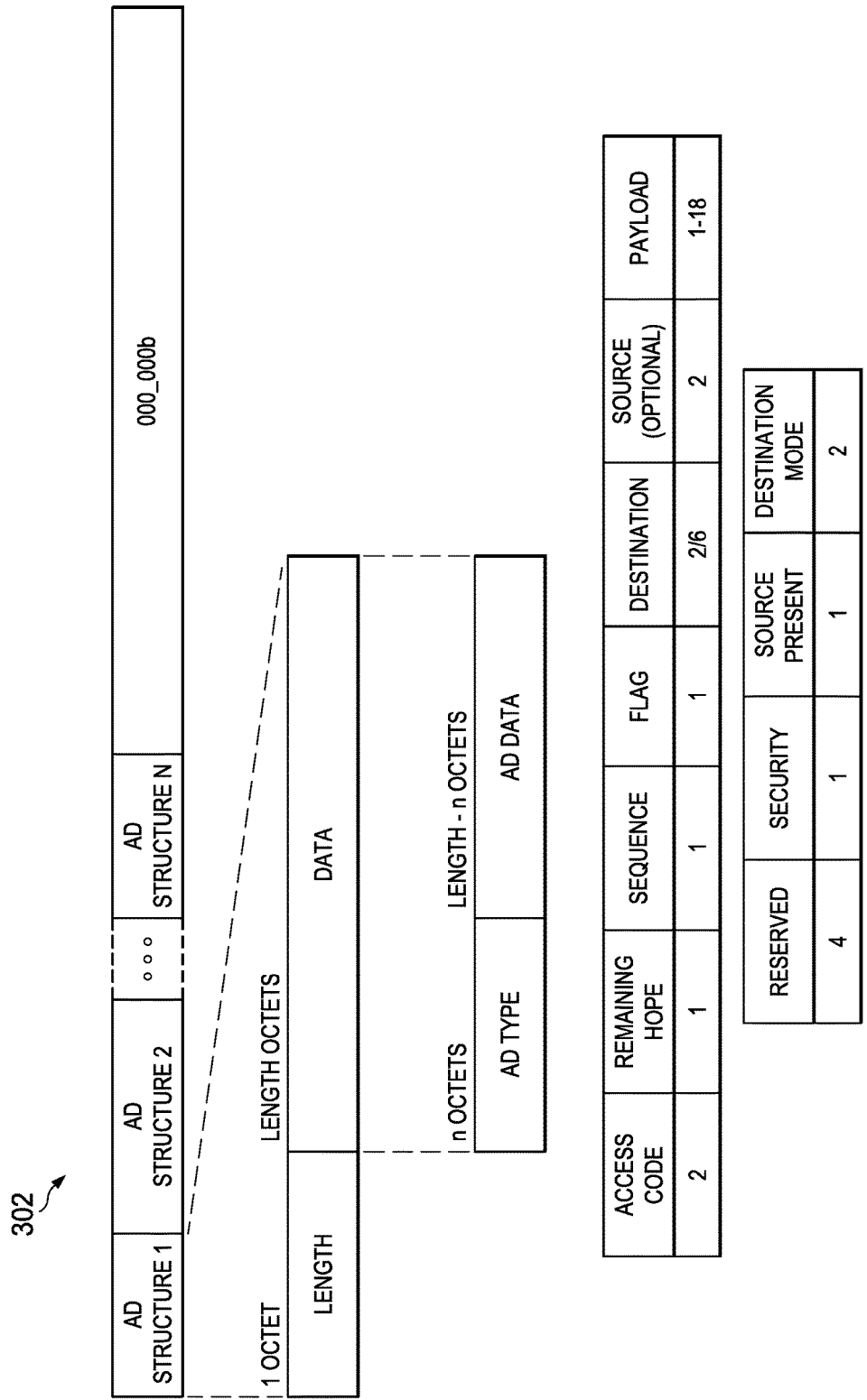
FIG. 3 illustrates an example frame format that is BLE specification complaint, in accordance with certain embodiments of the present disclosure.

FIG. 3 illustrates an example frame format that is BLE specification complaint, in accordance with certain embodiments of the present disclosure. In particular, FIG. 3 illustrates an example of a broadcast message 302 according to the BLE protocol. Broadcast message 302 may include a header structure 304 and a payload structure 306. Broadcast message 302 is BLE compliant. Also illustrated in FIG. 3 is an example of how the payload could be structured according to various embodiments. Broadcast message 302 includes payload structure 306. Payload structure 306 may include various fields 308-20 that reflect the BLE-compliant payload. For example, the payload of the example Figure is in data fields 1-18. FIG. 3 also illustrates a bit structure for the flag 314. Flag 314 may include various fields 322-28. This flag structure will allow for certain fields to be set asides for security, reservation, destination modes, etc.

Disclosed is a compression method and system for user friendly addressing in mesh networking. It addresses a need for enabling such mesh networking under restricted conditions without modifying existing Bluetooth specifications. A further need exists for a user friendly system. According to various embodiments, a method is proposed to compress not only a MAC address, but also enable a user to address the message using user-friendly terms such as "Table Lamp in Study Room" instead of multiple bytes of meaningless numbers.

What is claimed is:

1. A method for operating a mesh network using a protocol comprising an address and a payload, wherein the address and payload are restricted, the method comprising:
   using a hash function to generate a device address from a user-friendly address;
   assigning the generated device address to a device, wherein the device is part of a mesh network; and
   in a transmission from a source to the device, providing the generated device address within a payload of the transmission, the generated device address configured to route the transmission to the device;
   wherein:
      the user-friendly address comprises American Standard Code for Information Interchange (ASCII) characters;
      the user-friendly address that comprises ASCII characters is derived from a hierarchical structure and ASCII characters of levels in the hierarchal structure;
      a message uses a description as an address; and
      the description is transformed into the address using the hash function and added together with the message into the payload.

2. The method of claim 1, wherein the protocol is designed for a star network.

3. The method of claim 2, wherein the protocol is a Bluetooth low energy protocol.

4. The method of claim 1,
   wherein the user-friendly address comprises a graphical image.

5. The method of claim 1, wherein the user-friendly address comprises a multimedia file.

6. The method of claim 1, wherein providing the generated device address within the payload comprises mapping the generated device address to a network address.

7. The method of claim 1, wherein providing the generated device address within the payload comprises mapping the generated device address to a network address and a message integrity code.

8. The A method for operating a mesh network using a protocol comprising an address and a payload, wherein the address and payload are restricted, the method comprising:
   using a hash function to generate a device address from a user-friendly address;
   assigning the generated device address to a device, wherein the device is part of a mesh network; and
   in a transmission from a source to the device, providing the generated device address within a payload of the transmission, the generated device address configured to route the transmission to the device;
   wherein:
      the user-friendly address comprises American Standard Code for Information Interchange (ASCII) characters;
      providing the generated device address within the payload comprises mapping the generated device address to a network address and a message integrity code; and
      mapping the generated device address to the message integrity code comprises applying an exclusive-or function to a portion of the generated device address and the message integrity code.

9. A method for operating a mesh network using a protocol comprising an address and a payload, wherein the address and payload are restricted, the method comprising:
   using a hash function to generate a device address from a user-friendly address;
   assigning the generated device address to a device, wherein the device is part of a mesh network, the generated device address configured to route the transmission to the device; and
   in decoding a transmission from a source to the device, parsing the generated device address within a payload of the transmission;
   wherein:
      the user-friendly address comprises American Standard Code for Information Interchange (ASCII) characters;
      the user-friendly address that comprises ASCII characters is derived from a hierarchical structure and ASCII characters of levels in the hierarchal structure;
      a message uses a description as an address; and
      the description is transformed into the address using the hash function and added together with the message into the payload.

10. The method of claim 9, wherein the protocol is designed for a star network.

11. The method of claim 10, wherein the protocol is a Bluetooth low energy protocol.

12. The method of claim 9, wherein the user-friendly address comprises a graphical image.

13. The method of claim 9, wherein the user-friendly address comprises a multimedia file.

14. The method of claim 9, wherein providing the generated device address within the payload comprises mapping the generated device address to a network address.

15. The method of claim 9, wherein providing the generated device address within the payload comprises mapping the generated device address to a network address and a message integrity code.

16. The A method for operating a mesh network using a protocol comprising an address and a payload, wherein the address and payload are restricted, the method comprising:
   using a hash function to generate a device address from a user-friendly address;
   assigning the generated device address to a device, wherein the device is part of a mesh network, the generated device address configured to route the transmission to the device; and
   in decoding a transmission from a source to the device, parsing the generated device address within a payload of the transmission;
   wherein:
      the user-friendly address comprises American Standard Code for Information Interchange (ASCII) characters;
      providing the generated device address within the payload comprises mapping the generated device address to a network address and a message integrity code; and
      mapping the generated device address to the message integrity code comprises applying an exclusive-or function to a portion of the generated device address and the message integrity code.

* * * * *